United States Patent [19]

Brown et al.

[11] Patent Number: 4,807,472

[45] Date of Patent: Feb. 28, 1989

[54] MOTORCYCLE FUEL LEVEL GAUGE

[75] Inventors: William H. Brown, Menomonee Falls; Michael W. Hamann, Waukesha, both of Wis.

[73] Assignee: Harley-Davidson, Inc., Milwaukee, Wis.

[21] Appl. No.: 80,095

[22] Filed: Jul. 31, 1987

[51] Int. Cl.$^4$ .................. G01F 23/02; G01F 23/26
[52] U.S. Cl. ..................... 73/313; D10/101; D12/155; 73/317; 73/431; 338/33
[58] Field of Search ............. 73/308, 317, 431, 313; 280/5 A; 338/33; D10/101; D12/155

[56] References Cited

U.S. PATENT DOCUMENTS

| | | | |
|---|---|---|---|
| 3,168,904 | 2/1965 | Conover | 73/317 X |
| 3,439,543 | 4/1969 | Aldebough | 73/431 |
| 3,832,901 | 9/1974 | Giavin, III | 73/325 |
| 4,114,130 | 9/1978 | Sutton et al. | 73/317 X |

FOREIGN PATENT DOCUMENTS 0218796 12/1941 Switzerland ............. 280/289 R

OTHER PUBLICATIONS 1980 and 1981 Advertising Brochures for FSX and FXSH Motorcycle Models, Harley-Davidson, Inc. (Paper No. 4).

Primary Examiner—Daniel M. Yasich
Attorney, Agent, or Firm—John C. Cooper, II; Fred Wiviott; C. Thomas Sylke

[57] ABSTRACT

A fuel gauge for a fuel tank wherein external components of the gauge are configured to substantially resemble a conventional fuel filler cap, and in particular, the invention provides a single chambered fuel tank, fuel gauge and fuel filler cap configured to retain the appearance of a conventional dual chambered tank having separate fuel filler caps, but wherein the present fuel gauge retains the outward appearance of one of the caps for which it is substituted upon conversion of the dual chambered tank to a single chambered fuel tank.

7 Claims, 2 Drawing Sheets

MOTORCYCLE FUEL LEVEL GAUGE

BACKGROUND OF THE INVENTION

1. Field of the Invention

The present invention relates to a motorcycle fuel tank configuration, and particularly to the novel external appearance of a fuel level gauge configured to resemble a gasoline filler cap and to placement of the gauge to provide symmetry of appearance of the tank, and an oppositely disposed fuel level gauge and filler cap.

2. Description of the Prior Art

It is well known that motorcycle enthusiasts have a particular sense of pride in the appearance of their vehicles. Fuel tanks for motorcycles have, in the past, very often included dual tanks that provide separate gasoline supplies. The separate fuel chambers provided a means of signaling low fuel without requiring a separate fuel gauge. That is, when one side of the tank had emptied, a valve or other device would be actuated to permit dispensing of gasoline from the remaining filled chamber. Each of the chambers were provided with individual, substantially identical and oppositely located gas filler caps. Such arrangement permitted symmetry of appearance of the tank with the fuel filler caps being located at "mirror image" positions at either side of an imaginary vertical plane bisecting the fuel tank.

Recently, it has become commonplace to use a single tank for fuel. Since the cyclist was preconditioned as to the appearance of the former symmetrically disposed fuel filler caps, it has become apparent to the manufacturer that this appearance be maintained. The interesting components of the present invention provide an arrangement nostalgically resembling the previous aesthetic appearance of the tank and its components, and at the same time, provides the functional improvements of the modernized fuel tank, with a fuel gauge to indicate the level of the fuel within the tank.

OBJECTS AND SUMMARY OF THE INVENTION

It is the primary object of the present invention to provide a fuel tank configuration for motorcycles in which the external components associated with the fuel tank are symmetrically arranged at either side of the longitudinal axis of the fuel tank.

It is another object of the present invention to provide a fuel tank having a single fuel compartment or chamber for a motorcycle, which tank is devoid of a separating partition located internally of the tank, and which modified tank utilizes a single, rather than dual filler caps, but which tank further contains a fuel gauge substantially simulating the external configuration of the filler cap and residing oppositely of the fuel filler cap in substantially "mirror image" thereof.

A further object of this invention is to provide a novel fuel gauge for use with a motorcycle fuel tank.

How these and other objects of the present invention are accomplished will be described in the following detailed description of the preferred embodiment of the invention, taken in conjunction with the drawings.

In general, however, the objects are accomplished by providing a fuel level gauge for a single compartment motorcycle fuel tank, and wherein the mechanism for operating a fuel indicator is contained within a housing and a cover for the housing which emulates in substantial configuration an oppositely disposed fuel filler cap. The fuel level gauge is positioned in spaced relationship to provide a substantial "mirror image" of the filler cap at the opposite side of a vertical plane bisecting the fuel tank to provide the outward appearance of conventional dual filler caps.

DESCRIPTION OF THE PREFERRED EMBODIMENT

Figure 1:
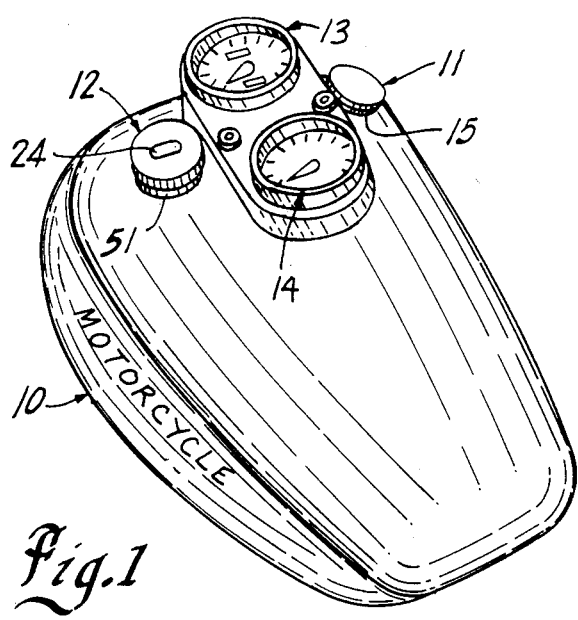
FIG. 1 is a perspective view of a motorcycle fuel tank and illustrating the external configuration of a fuel level gauge and of a fuel tank filler cap disposed at opposite sides of the fuel tank in accordance with the present invention.

With reference to the drawings, and particularly to FIG. 1, the present invention may preferably be used to measure the fuel level of a motorcycle fuel tank 10. The fuel tank 10 is preferably symmetrical in configuration and includes a filler cap assembly 11 and a tank fuel level gauge 12, each being indicated generally by their respective reference numerals, and disposed equidistant from the vertical plane longitudinally bisecting the tank 10. Positioned between the assembly 11 and gauge 12 are a conventional speedometer-odometer unit 13 and a tachometer 14.

Figure 2:
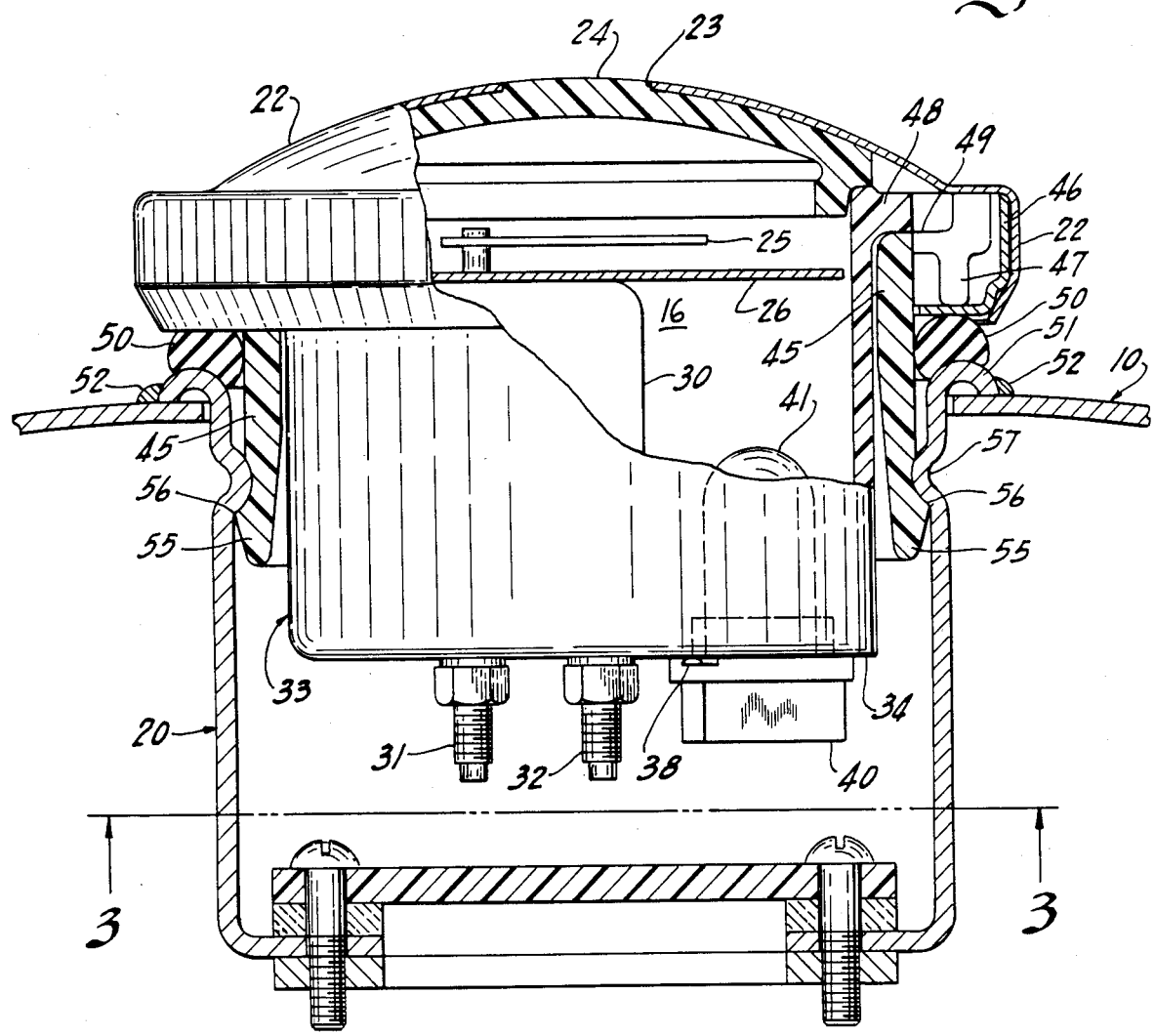
FIG. 2 is an elevational view of a fuel level gauge housing, partially in vertical section, and illustrating those several components of the gauge which reside in a housing in the tank in accordance with the teachings of this invention.

The filler cap assembly 11 is conventional, and is generally provided with an outwardly projecting hollow retainer portion 15 welded into the fuel tank 10 to accept the removable filler cap assembly 11. The general exterior appearance of the fuel level gauge assembly 12, as stated above, is substantially identical with the appearance of the exposed portions of the filler cap assembly 11 and includes an exposed portion 51 (see FIG. 2) of a hollow retainer housing 20 welded into the fuel tank 10. Further, there is a window portion 23 blanked or otherwise removed from the cover 22 to receive a transparent plastic or glass member 24 secured to the inner surface of the cover 22 to provide visual access to a fuel indicator having a needle 25 and an indicia plate 26 revealing the amount of fuel remaining in the tank 10.

Figure 3:
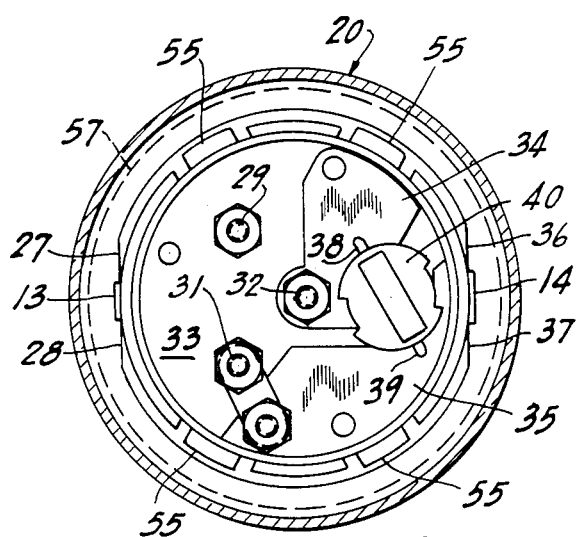
FIG. 3 is a bottom plan view, taken along lines 3—3 of the housing and gauge of FIG. 2.

The housing 33 of the fuel level gauge assembly 12 contains an electrically operated mechanism 30 for moving the indicator needle 25 in accordance with the amount of electrical current supplied to the mechanism. The amount of current is proportional to the height of the fuel level as will be hereinafter described. The mechanism 30 includes a conventional air-core gauge movement (not shown) or other electrically driven rotor means responsive to current supply for rotating the needle 25. Terminals 31 and 32 extend from an insulating housing 33 containing the operating mechanism, and are separately engageable with conducting layers 34 and 35 (See FIG. 3) embedded in the bottom of the molded housing 33. These layers 34, 35 serve to conduct current to outwardly extending leaf spring contacts 38 and 39 supported by and extending from an incandescent lamp receptacle 40. The receptacle 40 is adapted to receive a plug-in lamp 41 for illuminating the needle 25 and its indicia plate 26. The insulating housing 33, along with an annular plastic member 45 surrounding the housing 33, are retained within the confines of the cover 22 by means of a support ring 46 engageable with an annular, downwardly extending flange 47, and an outwardly extending flange 48 extending from the housing 33 and resting upon a shoulder 49 of the member 45. The outer edges of the cover 22 are bent inwardly to retain the support ring 46. There is also supplied an annular sealing gasket 50 seated intermediate the lower surface of the support ring 46 and the overturned annular flange 51 of the housing 20, which flange 51 is further secured to the top of the fuel tank 10 by means of a weld 52.

The fuel level gauge assembly 12 comprising a subassembly 16 including the insulating housing 33, its contents, the surrounding annular member 45, the cover 22 and the gasket 50. The subassembly 16 is retained in place within the housing 20 by means of flexible barb-like portions 55 depending downwardly of the annular member 45 and provided with indent shouldered surfaces 56. The shouldered surfaces 56 are engageable with respective ones of circumferentially spaced, inwardly projecting ribs or detents 57 on the housing 20. The arrangement is intended to permit the subassembly 16 and its contents to remain in place during normal operations, but which arrangement also permits removal of the subassembly 16 and its contents for replacement or repair of components. Removal of the subassembly 16 from the housing 20 is accomplished by manually pulling on the retained cover 22 of subassembly 16 straight out relative to the housing 20 to release the engaging elements 55, 56 and 57 and permit separation of the members 12 and 20 from one another. To insure orientation of the cover window 24 with the fuel tank 10 and vehicle operator the annular member 45 has longitudinal ribs 13 and 14 (see FIG. 3) which engage detents 27, 28 and 36, 37, respectively, on housing 20 and prevent rotation of the assembly 12 relative to housing 20. To further insure proper orientation, ribs 13 and 14 are of different widths with detents 27, 28 and 36, 37 being spaced proportionately to thereby prevent incorrect installation of the assembly 12.

Figure 4:
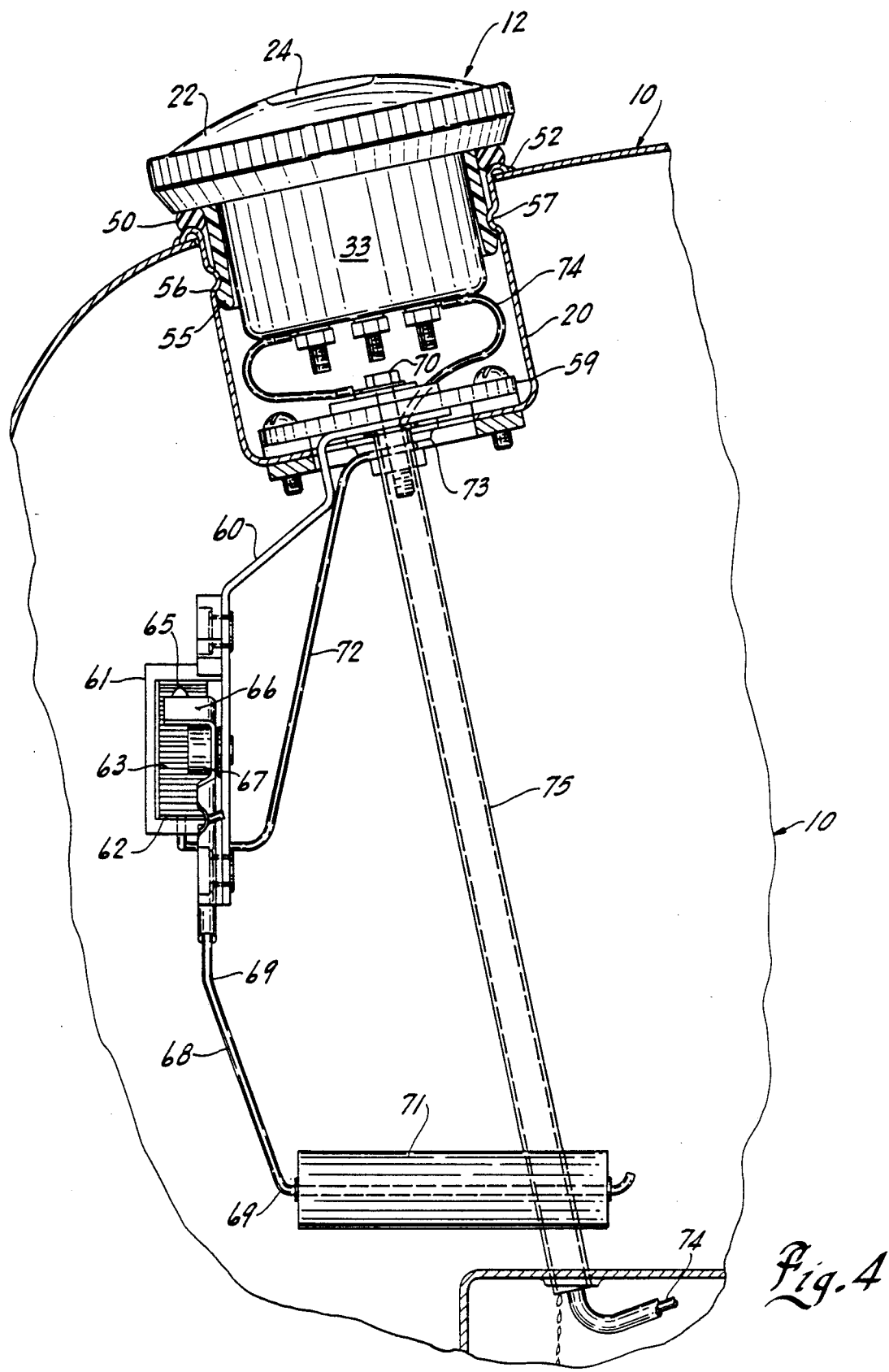
FIG. 4 is an elevational view, partly in section, of a motorcycle fuel tank containing a fuel gauge as taught by the present invention.

With reference to FIG. 4, there is shown a bracket 60 extending from the bottom of mounting plate 59 through a hole in the bottom of the housing 20. The bracket 60 is arranged to support an insulating variable resistor housing 61, which has supported on its interior circular surface an insulator strip 62 upon which is wound resistor wire convolutions 63 which may be engaged by a movable contact 65 extending outwardly from a pivotally supported, relatively flat float support 66 seated on an inwardly projecting pivot member 67. The float support 66 extends outwardly of the housing 61 to provide a support for a float arm 68. The arm 68 is bent intermediate its ends at 69 to provide an extension for pivotally supporting a float 71. The float 71 is of a material and construction capable of floating on the gasoline or other fuel contained within the tank 10.

It will be apparent that, as the level of the fuel decreases, the float 71 will move with the level to cause the float support 66 to rotate about its pivot 67 and thereby rotationally move the electrical contact 65 with respect to the resistor windings or convolutions 63. This motion will vary current supplied through the resistor 63 from a conductor lead 72 which terminates at its opposite end in an insulator 73 located at the top of the bracket 60. The controlled electrical current output is transmitted through the lead 74 from a battery (not shown) to terminal 31, through the air-core gauge terminal 29, to terminal 70, through lead 72, through resistor 63 to ground through bracket 60 thereby causing movement of the air-core gauge needle 25 proportionally relative to the level of the fuel supporting the float 71.

Attached to and extending below the bottom of the housing 20 and through the bottom of the tank 10 is a drain tube 75 for transporting condensate that often collects internally on metallic objects because of changes in ambient or weather conditions. The tube 75 is also the conduit for power lead 74.

As stated previously, the outer configuration of the motorcycle fuel tank, along with its filler cap assembly and level gauge assembly, are intended to maintain substantially the same configuration as previous fuel tanks having dual, partitioned fuel chambers. In the previous tanks (not shown) there were positioned separate fuel filler cap assemblies located at opposite sides of a plane bisecting the fuel tank and in mirror-image with one another. The present invention contemplates substantially identical positioning of the present filler cap assembly 11 with respect to the level gauge assembly 12. This positioning assists in retaining the consumer image of the motorcycle.

We claim:

1. A fuel level gauge assembly for a fuel tank, said assembly including a housing having a removable subassembly having a portion thereof secured to and extending outwardly of said fuel tank and having a subassembly portion extending inwardly of the fuel tank, and a retained cover member for the outwardly extending portion of said housing, said cover member including a viewing area in a selected portion of said cover member for visual observation of fuel level indicating means contained within said housing, and wherein the said cover member and said outwardly extending subassembly portion are characterized in appearance to substantially resemble a conventional fuel tank filler cap.

2. In combination:
a motorcycle fuel tank;
a fuel tank filler cap assembly comprising a stationary cap retainer having a portion projecting outwardly of said fuel tank and a removable closure cap engageable with the exposed open end of said cap retainer portion to provide a closure therefor; and
a fuel level gauge assembly for said fuel tank, said fuel level gauge assembly including a selectively removable component housing having a subassembly having a portion thereof secured to and projecting outwardly relative to said fuel tank and having a retained cover member with an indicator viewing area in a selected portion of said cover member; and wherein the overall configuration of said fuel level gauge assembly substantially conforms in appearance to the overall configuration of the said fuel tank filler cap assembly.

3. In combination:
a single compartment motorcycle fuel tank;
a fuel tank filler cap assembly comprising a stationary cap retainer having a portion projecting outwardly of said fuel tank and a removable closure cap engageable with the exposed open- end of said cap retainer portion to provide a closure therefor; and a fuel level gauge assembly for said fuel tank positioned on said tank and disposed at a substantially mirror-image location oppositely spaced from said filler cap assembly and relative to a vertical plane longitudinally bisecting said fuel tank, said fuel level gauge assembly including a component housing having a portion secured to and projecting outwardly relative to said fuel tank and having a permanent closure top with an indicator viewing area in a preselected portion of the closure top, said housing portion and said cap retainer portion being of substantially identical external dimensions, and said closure cap and said closure top being of substantially identical dimension, whereby the overall configuration of said fuel level gauge assembly substantially conforms in appearance to the overall configuration of the said fuel tank filler cap assembly.

4. The combination of claim 3 wherein the housing of said fuel gauge assembly includes therein fuel level indicating means visually perceptible through the viewing area of said cap.

5. The combination of claim 4, wherein the said housing further includes therein electric means for actuating the indicator means responsive to variations of electric current supplied thereto, and wherein the electric current flow is varied depending upon fluid level in the said fuel tank.

6. The combination of claim 4, further including an electric current supply, and wherein the said fuel gauge assembly includes float means responsive to fuel level in said fuel tank and further including variable resistor means controlling the flow of electric current from said supply responsive to fuel level position, to thereby operate the said fuel level indicator means responsive to the fuel level.

7. The combination of claim 6, wherein the said variable resistor means comprises a resistance material connected at one end thereof to said current supply through the fuel gauge assembly and slidably electrically engageable with a movable contact, and a float member directly controlling the movement of said contact responsive to the fuel level in said fuel tank.

* * * * *